United States Patent
Du et al.

(10) Patent No.: US 9,306,733 B2
(45) Date of Patent: Apr. 5, 2016

(54) METHOD OF SYNCHRONIZING A COMMUNICATION SYSTEM

(71) Applicant: BROADCOM CORPORATION, Irvine, CA (US)

(72) Inventors: Kevin Zhifang Du, San Jose, CA (US); Brian Robert Wiese, San Francisco, CA (US); Michael Eugene Locke, Santa Clara, CA (US); Richard Glentworth Greenfield, San Jose, CA (US)

(73) Assignee: BROADCOM CORPORATION, Irvine, CA (US)

( * ) Notice: Subject to any disclaimer, the term of this patent is extended or adjusted under 35 U.S.C. 154(b) by 181 days.

(21) Appl. No.: 14/091,612

(22) Filed: Nov. 27, 2013

(65) Prior Publication Data

US 2014/0241384 A1 Aug. 28, 2014

Related U.S. Application Data

(60) Provisional application No. 61/770,734, filed on Feb. 28, 2013, provisional application No. 61/907,293, filed on Nov. 21, 2013.

(51) Int. Cl.
*H04L 7/04* (2006.01)
*H04L 27/26* (2006.01)
*H04B 3/32* (2006.01)
*H04M 11/06* (2006.01)

(52) U.S. Cl.
CPC ........ *H04L 7/043* (2013.01); *H04B 3/32* (2013.01); *H04L 27/2613* (2013.01); *H04L 27/2656* (2013.01); *H04M 11/062* (2013.01); *H04L 27/2671* (2013.01); *H04L 27/2675* (2013.01)

(58) Field of Classification Search
USPC .................................. 370/503–515
See application file for complete search history.

(56) References Cited

U.S. PATENT DOCUMENTS

| 7,376,157 B1 * | 5/2008 | Fazlollahi et al. ............ 370/514 |
| 2012/0155648 A1 * | 6/2012 | Tupala ......................... 380/287 |
| 2013/0294597 A1 * | 11/2013 | Shi et al. .................. 379/406.01 |
| 2014/0071997 A1 * | 3/2014 | Oksman et al. .............. 370/474 |

* cited by examiner

Primary Examiner — Awet Haile
Assistant Examiner — Kent Krueger
(74) Attorney, Agent, or Firm — Garlick & Markison; Randy Lacasse (57) ABSTRACT

A method of synchronizing a time division duplex (TDD) multi-line, multi-carrier data communication system is provided. Synchronization is established using unique pseudo-random bit sequences (PRBS) from a common generator polynomial having different seed values. Due to low correlation of PRBS generated with different seed values, a remote unit can only synchronize to its intended signal effectively mitigating far-end and near-end crosstalk impact of large bandwidth very high speed digital subscriber lines (VDSL).

20 Claims, 7 Drawing Sheets

METHOD OF SYNCHRONIZING A COMMUNICATION SYSTEM

CROSS-REFERENCE TO RELATED APPLICATIONS

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Application No. 61/770,734, entitled "Method of Synchronizing TDD Multi-line Multi-carrier Communication System," filed Feb. 28, 2013; and
2. U.S. Provisional Application No. 61/907,293, entitled "Method of Synchronizing a Communication System," filed Nov. 21, 2013.

BACKGROUND

1. Technical Field

The present disclosure described herein relates generally to communication networks and more particularly to synchronization of communication systems.

2. Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireline communication systems may operate in accordance with one or more standards including, but not limited to, Digital Subscriber Lines (DSL) such as Asymmetric DSL (e.g., ADSL2+ represented as International Telecommunication Union (ITU G.992.5)), Very High Speed Digital Subscriber Line 2 (VDSL2; ITU G.993.2), G.fast (Gigabit fast), handshake procedures for digital subscriber line transceivers (G.994.1) and/or variations thereof.

Communication systems as described herein include the transmission of data in the form of packets. In a typical configuration, each packet of data may contain bytes of information at the beginning of the data frame that facilitate synchronization with receiving devices called a preamble or training sequence. In parallel communication channel systems (e.g., DSLs), the preamble can be used to identify distinctive data packets communicated on different parallel channels and therefore the data packet does not require a unique identifier. DSLs represent multi-line, multi-carrier wide-band communication systems. These systems require accurate symbol frame alignment to perform properly and maintain stability. Current DSL implementations, such as ITU G.993.2 VDSL2, utilize common pseudo-random bit sequences (PRBS) for all lines for remote unit symbol frame alignment. In VSDL2, a Frequency Division Duplex (FDD) system, near-end crosstalk (NEXT) generally does not cause synchronization problems while far-end crosstalk (FEXT) impact is relatively low as signal bandwidth is limited to, for example, 17 MHz. However, such an approach can face problems in a Time Division Duplex (TDD) system such as G.fast where signal bandwidth is up to 100 MHz, while loop length is expected to be less than 250 meters. Under such conditions, both NEXT and FEXT can have a strong presence and cause false symbol frame alignment to remote units if an identical synchronization signal is used for all lines.

DETAILED DESCRIPTION

Figure 1:
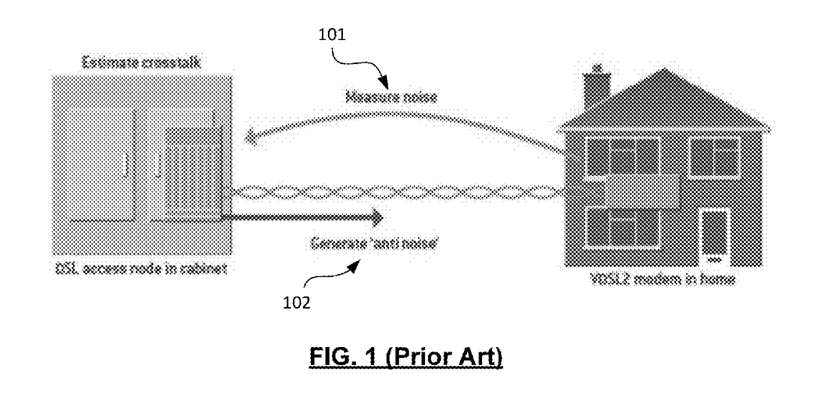
FIG. 1 illustrates a known method to reduce crosstalk for a wired communications system.

FIG. 1 illustrates a known synchronizing technique using a DSP-based method called vectoring to reduce crosstalk. The user's DSL modem expects to see the modulated sync symbol but, in reality, sees a modulated sync symbol distorted with crosstalk from the modulated sync symbols transmitted on the neighboring lines. In step 101, the modem measures the error (crosstalk) and sends it back to the digital subscriber line access multiplexer (DSLAM). The DSLAM correlates the received error values on the 'victim' line with the pilot sequences transmitted on all other 'disturber' lines. By doing this, the DSLAM gets a measure of the crosstalk coupling for every disturber-victim pair. The final step 102 is the generation of anti-noise within the DSLAM. This anti-noise is injected into the victim line on top of the transmit signal such that it cancels the crosstalk signal picked up over the telephone pair. This process is repeated for each line.

Figure 2:
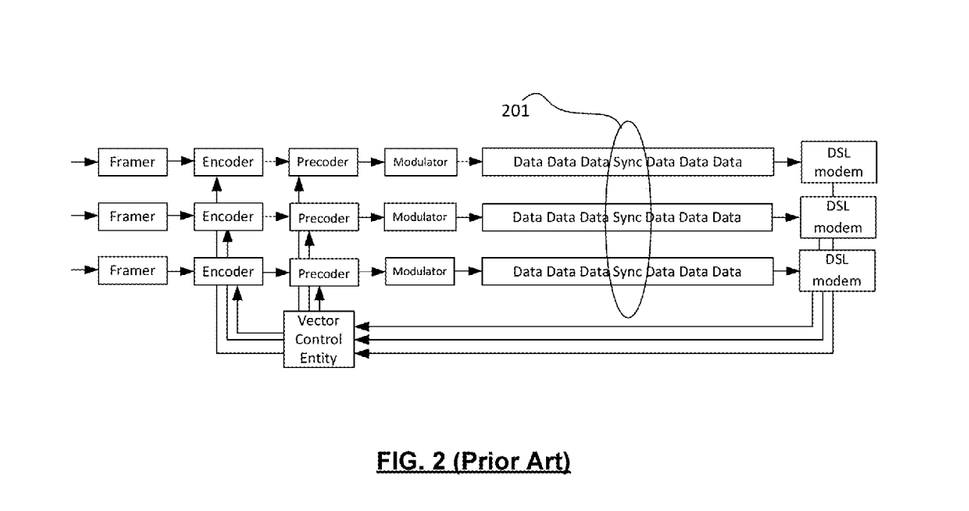
FIG. 2 illustrates a known synchronizing system using DSP-based vectoring to reduce crosstalk.

FIG. 2 illustrates a known synchronizing system using DSP-based vectoring to reduce crosstalk. To calculate the crosstalk coupling between the pairs in the cable bundle, use is made of a 'sync' symbol 201, sent after every 256 data symbols. This equates to a sync symbol being sent every 64 ms. Each sync symbol is modulated with one bit of a pilot sequence. The length of the pilot sequence is dependent on the number of VDSL2 lines in the vectoring group: in a system with 192 VDSL2 lines, 256 bit long pilot sequences are used (the next highest power of two). In addition, each twisted pair is assigned a unique pilot sequence, with the pilots usually chosen such that they are mutually orthogonal.

Figure 3:
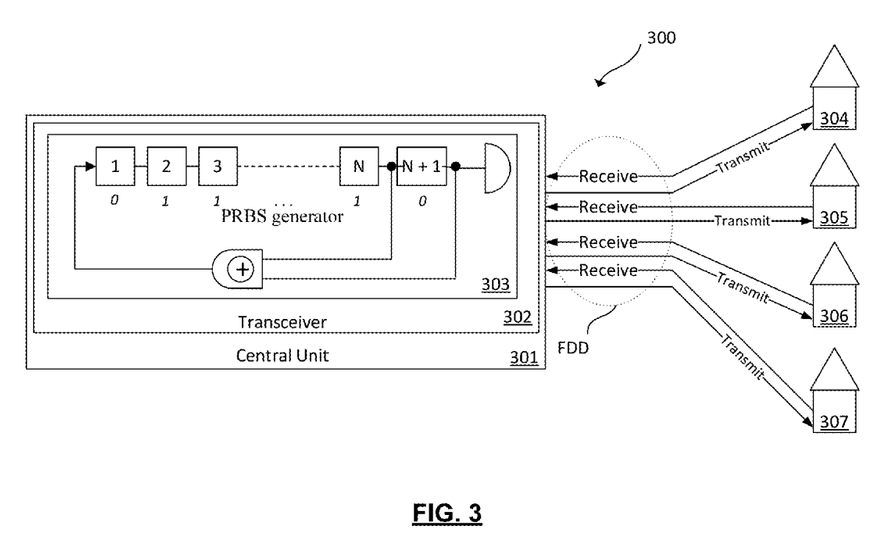
FIG. 3 illustrates a schematic diagram of a VDSL communications system using Frequency Division Duplexing (FDD) for transmitting and receiving data in accordance with the present disclosure.

FIG. 3 illustrates a schematic diagram of a VDSL communications system using Frequency Division Duplexing (FDD) for transmitting and receiving data in accordance with the present disclosure. Unique pilot sequences, such as pseudo-random bit sequences (PRBS) are used throughout telecommunications, encryption, and simulations. In VDSL telecommunication systems, for example, PRBSs are used to establish a timing protocol between a transmitting device and receiving device in order to synchronize data transfers. Conventional VDSL system 300 includes central unit 301 with transceiver (transmitter and receiver) 302 with PRBS generator 303 that outputs pseudo-random sequences including a random seed (initial) value. A common PRBS is used for all communication lines from central unit 301 to remote units 304, 305, 306 and 307.

Figure 4:
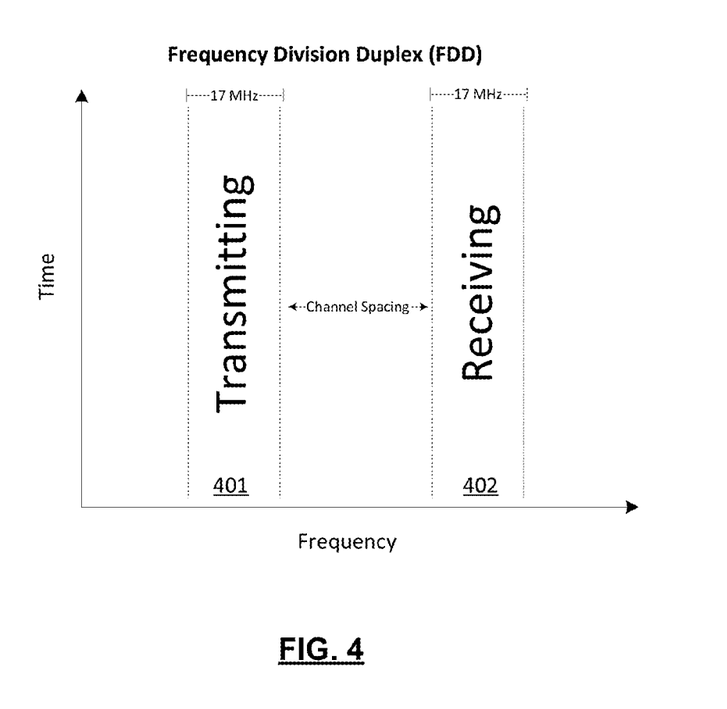
FIG. 4 illustrates a chart exemplifying Frequency Division Duplexing (FDD) on a time vs. frequency (17 MHz) plot in accordance with the present disclosure.

FIG. 4 illustrates a chart exemplifying Frequency Division Duplexing (FDD) on a time vs. frequency (17 MHz) plot in accordance with the present disclosure. In an VDSL2 system where signals are transmitted and received using FDD (as illustrated in FIG. 4), synchronization and crosstalk issues are relatively low due to limited signal bandwidth (i.e., 12-17 MHz) because transmitting and receiving signals occupy distinctly separate channels (401 and 402). It is well known that crosstalk levels increase as the signal bandwidth frequency increases and future DSL systems may incorporate signal bandwidth frequencies above those currently used for VDSL2.

Figure 5:
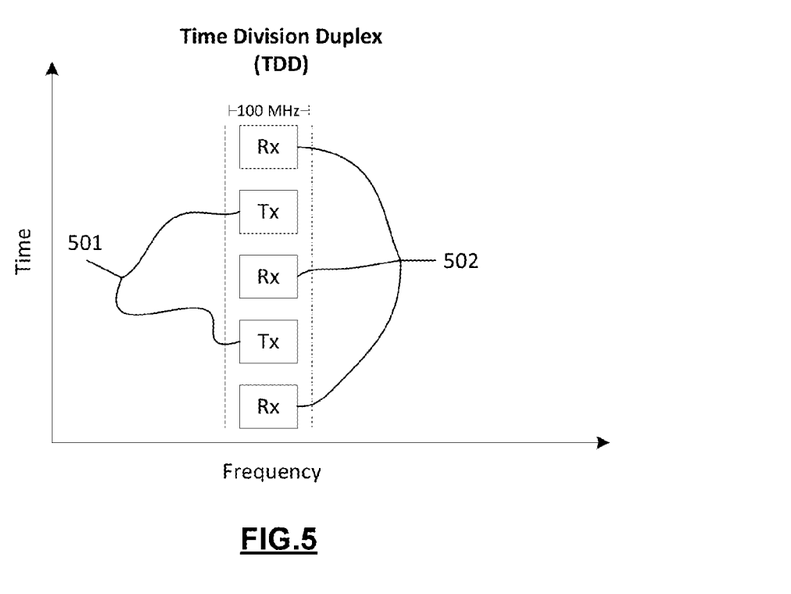
FIG. 5 illustrates a chart exemplifying Time Division Duplexing (TDD) on a time vs. frequency (100 MHz) plot in accordance with the present disclosure.

FIG. 5 illustrates a chart exemplifying Time-Division Duplexing (TDD) on a time vs. frequency plot in accordance with the present disclosure. Time-division duplexing (TDD) is the application of time-division multiplexing to separate outward and return signals. It emulates full-duplex communication over a half-duplex communication link. As shown, transmitted data (Tx) 501 is alternated (multiplexed) with received data (Rx) 502 in the same frequency band/channel (e.g., 100 MHz). Time-division duplexing has a strong advantage in the case where there is asymmetry of the uplink and downlink data rates. As the amount of uplink data increases, more communication capacity can be dynamically allocated, and as the traffic load becomes lighter, capacity can be taken away. The same applies in the downlink direction.

Figure 6:
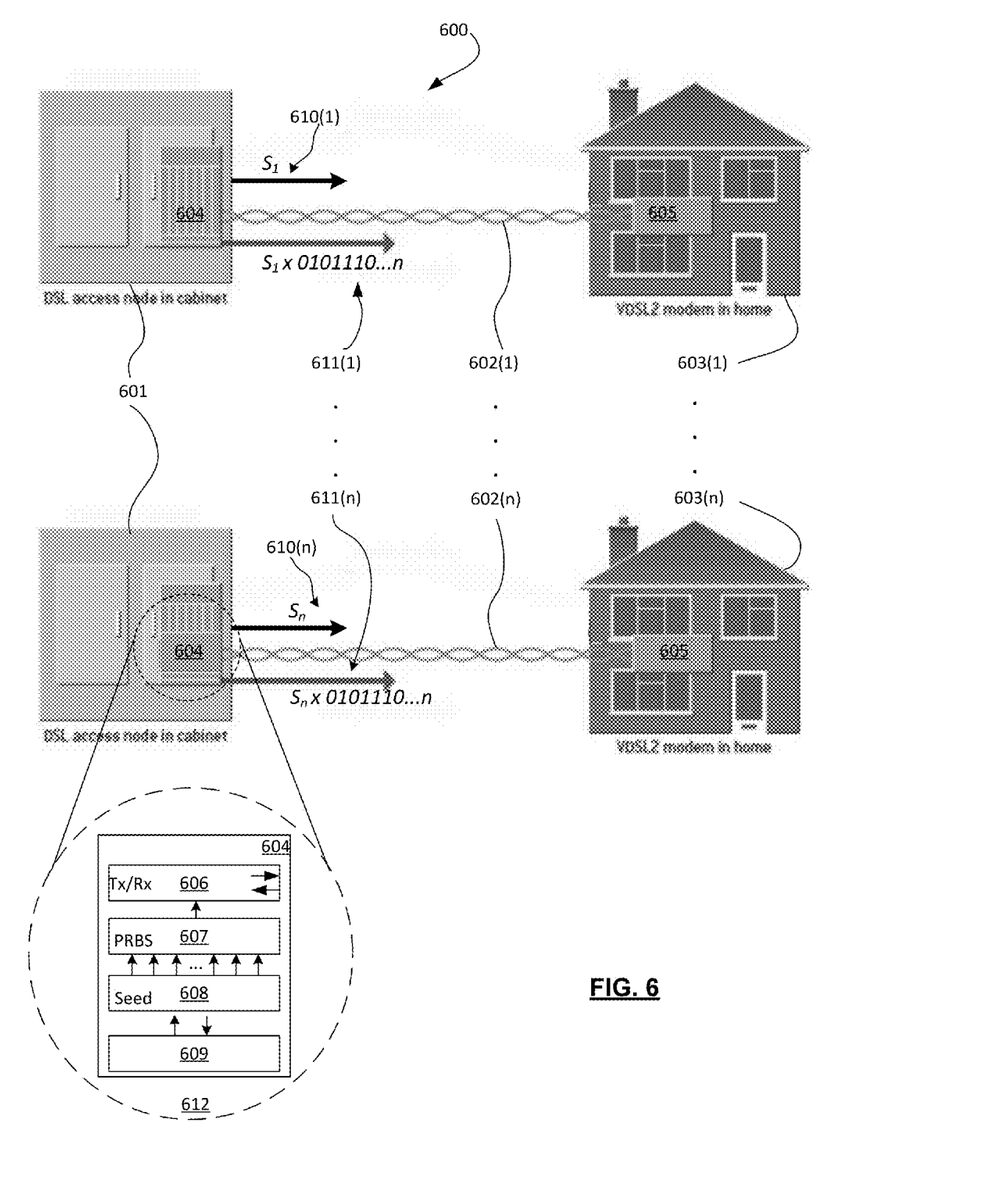
FIG. 6 illustrates one embodiment of a communication system in accordance with the present disclosure.

FIG. 6 illustrates one embodiment of a communication system in accordance with the present disclosure. Multi-line, multi-carrier system 600 (e.g., implemented with G.fast communication signaling) includes central unit 601 (e.g., DSL/VDSL access node cabinet) communicating over a plurality of communication lines (e.g., twister copper) 602(1-$n$) to remote units 603(1-$n$). Unlike FDD systems, G.fast systems utilize TDD (as illustrated in FIG. 5) to communicate data packets between central unit 601 and multiple remote units 603(1-$n$). As opposed to FDD, where data transmissions and receipts occur on separate channels, TDD transmits and receives data on the same channel over a larger bandwidth.

In TDD systems, NEXT will be a dominating noise source before TDD frame synchronization is achieved. In addition, FEXT is expected to be stronger than VDSL2 due to short loop length (up to 250 m) and wider bandwidth (e.g., 100 MHz). To mitigate FEXT and NEXT impact to remote unit synchronization to a TDD frame, each transmission line includes a unique downstream and upstream PRBS sequence from a common generator polynomial, but with a different seed value. Due to low correlation of PRBS sequences generated with different seed values, a remote unit (e.g., home modem) synchronizes only to its intended signal. By initializing the PRBS generator polynomial with different seed values ($S_1$ and $S_2$, where $S_1 \neq S_2$), PRBS sequences used for each line and for each direction are different, effectively reducing cross-correlation. As a result, a transceiver can take advantage of the known unique sequence to synchronize only on its intended signal thus preventing training on crosstalk.

Central unit 601 and each remote unit 603 (e.g., 1, 2, 3 ... $n$) include at least communication units 604 and 605, respectively. Communication unit 604 is located in central unit 601 and is shown in greater detail in breakout 612. Communication unit 604 includes at least: transceiver 606 for transmitting and receiving communication signals; PRBS generator 607 to generate pseudo-random bit sequences; and seed value generator 608 to generate unique seed values (or unique seed value pairs). Unique seed values are passed to the PRBS to seed one or more polynomials to produce unique pseudo-random bit sequences. Communication unit 604 transmits and receives communication signals over established communication pathways (channels) between the central unit 601 and remote units 603(1-$n$) over communication lines 602(1-$n$). In addition, communication unit 604 synchronizes transmissions over the communication pathways as will be discussed in greater detail hereafter.

A communication unit 605 is located in each remote unit 603(1-$n$), and includes at least: a transceiver 606 for transmitting and receiving communication signals and a PRBS generator 607 to construct pseudo-random bit sequences matching those provided by central unit 601. In one embodiment, the unique seed values (e.g., $S_1$-$S_n$) generated at the central unit are assigned to a specific remote unit and transmitted 610(1-$n$) to the remote unit in advance of a synchronization sequence. The remote unit PRBS constructs a unique pseudo-random bit sequence using the transmitted unique seed value. In an alternative embodiment, PRBS generator 607 also includes a seed value generator 608 to generate unique seed values (or unique seed value pairs—see FIG. 8 description). Unique seed values are transmitted using a low-bandwidth handshaking or message-exchange protocol.

Communication units 604 and 605 may also contain a communication signal processing module 609 including, but not limited to, a signal/computer processor, memory, firmware, software as well as other communication elements associated with traditional processing of communication signals. These elements provide additional functionality such as, but not limited to, comparator functionality to compare incoming pseudo-random bit sequences to locally constructed pseudo-random bit sequences; error detection to detect errors and calculate bit error rates; and assignment of unique seed values to specific remote devices.

In operation, seed value generator 608 generates and assigns unique seed values/value pairs for the plurality of remote units. Once assigned, the unique seed values/value pairs are transmitted 610(1-$n$) to the remote units to be used in the remote unit PRBS to replicate and an incoming unique seed pseudo-random bit sequence transmitted from central unit 601. Seed values are, in various embodiments, generated: randomly; incrementally; by offset (e.g., +n added to previously generated seed value); every "n" numbers (e.g., every 100 numbers); prime numbers or by other similar and/or equivalents methods.

In operation, unique seeds or seed pairs are generated, assigned to a remote unit, and transmitted thereto. The unique seeds are then used in combination with a known polynomial to construct identical unique seed pseudo-random bit sequences (PRBS) at both the central and remote units. The constructed unique seed pseudo-random bit sequence is sent 611(1-$n$) to the remote unit 603(1-$n$) where it is compared to detect errors, calculate subsequent error rates, frame alignment, etc. The unique seed pseudo-random bit sequences are first transmitted as an initial synchronization before transmission of wideband communication signals and thereafter for continued synchronization during repeated time slots allocated for downstream/upstream communication signaling.

Furthermore, synchronization algorithms can remain unchanged by only using the unique known sequence. A common PRBS generator polynomial, defined by standard and known to any implementation, is used which allows for simple implementation as well as backward compatibility. Seed values are determined and assigned by network equipment via an independent protocol (such as G.994.1) which is commonly used to negotiate fundamental parameters such as the operating mode. Omega DSL acceleration, G.fast, VDSL or other equivalent acceleration techniques can, in some embodiments, be used without departing from the scope of the technology described herein.

Figure 7:
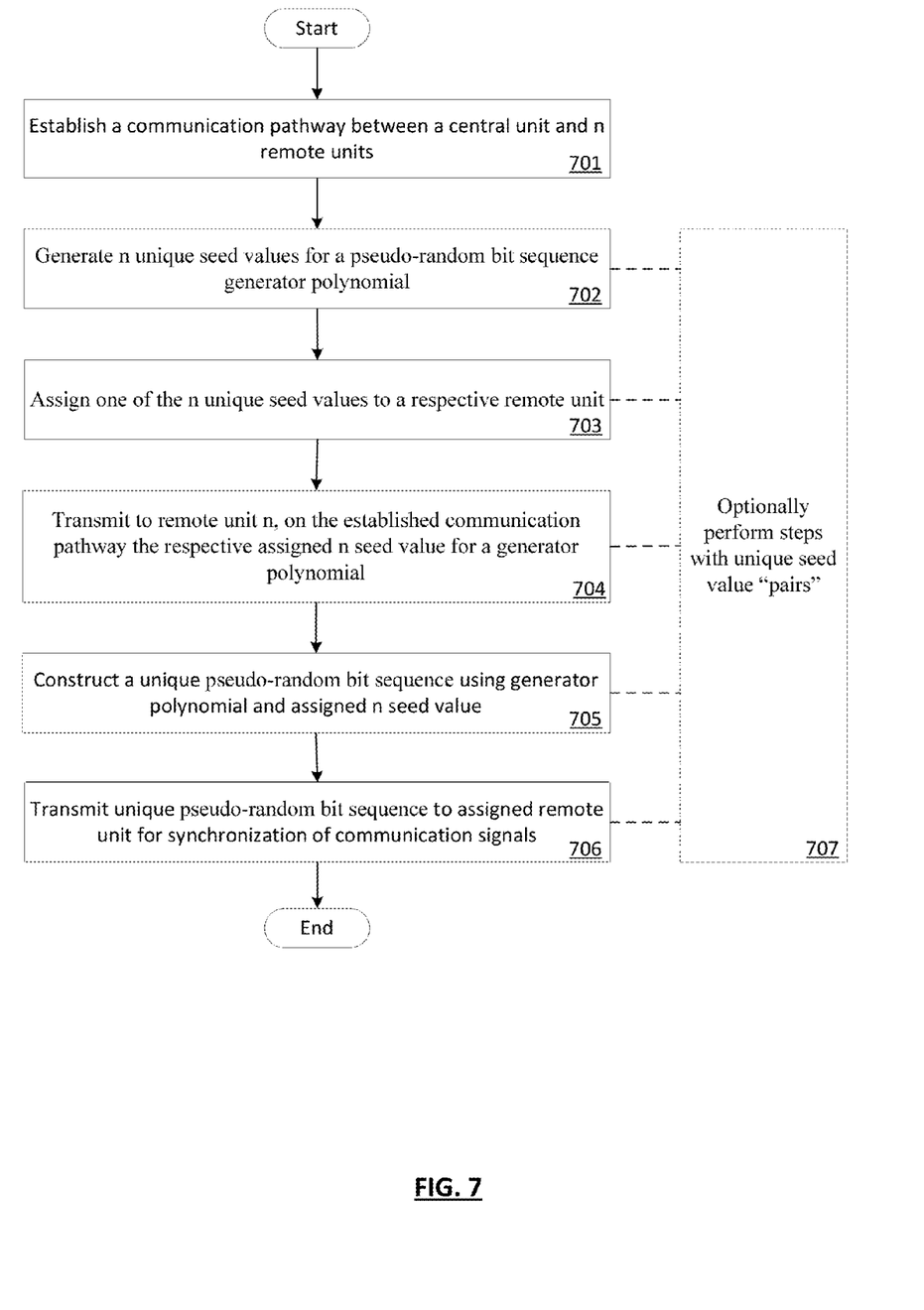
FIG. 7 illustrates a flow diagram of one embodiment method in accordance with the present disclosure.

FIG. 7 illustrates a flow diagram of one embodiment method in accordance with the present disclosure. In step 701, a communication pathway between a central unit and two or more remote units is established. In step 702, n unique seed values for a pseudo-random bit sequence generator polynomial are generated. In step 703, one of the n unique seed values is assigned to a respective remote unit. In step 704, the respective assigned n seed value for a PRBS generator polynomial is transmitted to remote unit n. In step 705, a unique pseudo-random bit sequence is constructed using the PRBS generator polynomial and assigned n seed value. Step 706 includes using the unique pseudo-random bit sequence to assigned remote unit n for synchronization of communication signals. The using step includes at least transmission and comparison of the constructed unique pseudo-random bit sequence to synchronize the communication pathway (e.g., channel). In an alternative embodiment, seed values are replaced by seed value pairs in the method of FIG. 7 and as further illustrated and described in accordance with FIG. 8 and FIG. 9.

Synchronization includes, but is not limited to, TDD frame and symbol alignment with remote units. The unique pseudo-random bit sequence transmission takes place on the established communication pathway (e.g., channel) with an initial downstream transmission during time slots designated for downstream transmission to the remote units. The downstream transmission is repeated during allocated time slots to ensure synchronization is maintain throughout communications.

Figure 8:
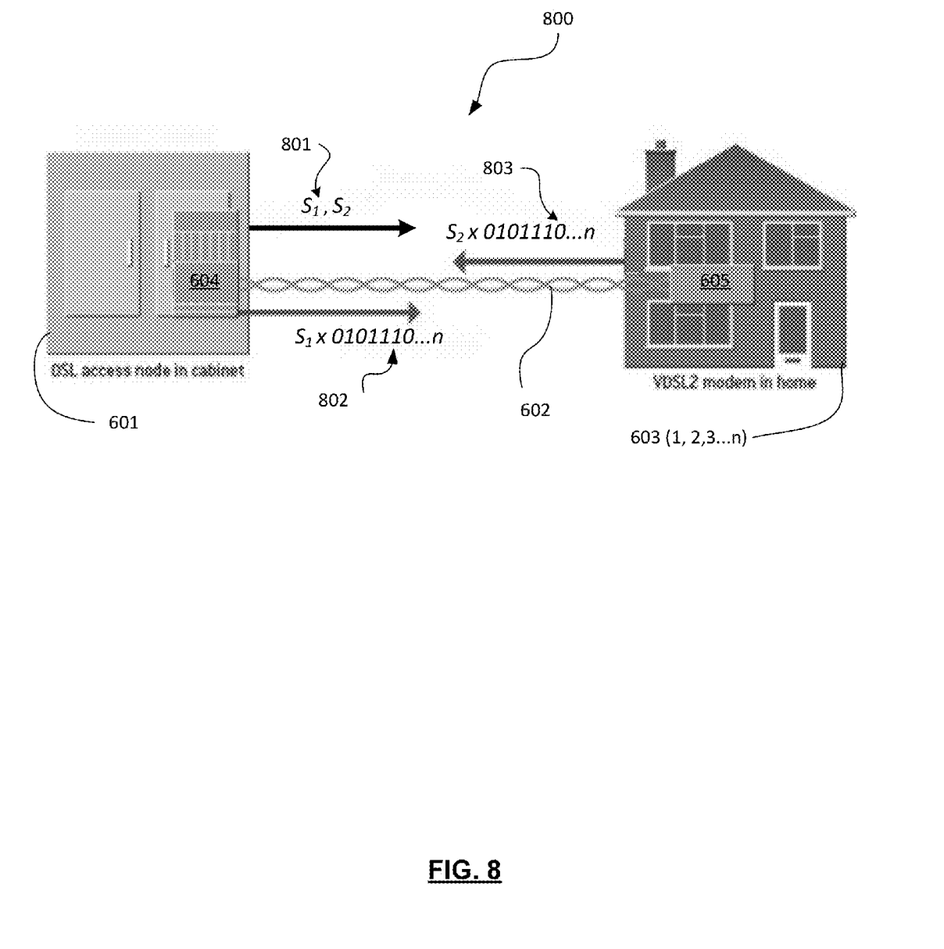
FIG. 8 illustrates another embodiment of a communication system in accordance with the present disclosure.

FIG. 8 illustrates another embodiment of a communication system in accordance with the present disclosure. When unique seed value pairs ($S_1$, $S_2$; where $S_1 \neq S_2$) are generated and assigned, they are transmitted 801 to their assigned remote units (e.g. 603(1-$n$)). The unique seed value pairs may be stored in memory for later use or fed directly to the PRBS generator. The remote unit constructs two unique pseudo-random bit sequences—a downstream unique pseudo-random bit sequence 802 using first unique seed value $S_1$ and an upstream unique pseudo-random bit sequence 803 using the second unique seed value $S_2$. The central unit 601 will also construct identical unique pseudo-random bit sequences and use them to synchronize the upstream and downstream communication pathways. FIG. 8 is described in greater detail in association with the below FIG. 9 discussion.

Figure 9:
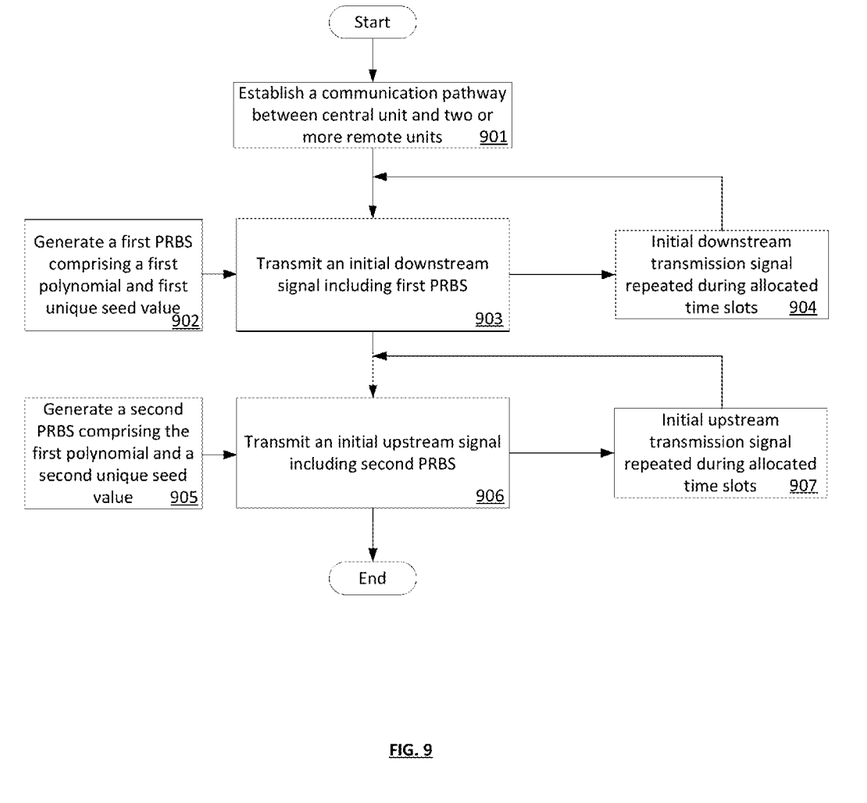
FIG. 9 illustrates a flow diagram of another embodiment method in accordance with the present disclosure.

FIG. 9 illustrates a flow diagram of another embodiment method in accordance with the present disclosure. In step 901, a communication pathway between a central unit and a remote unit is established. While described for a single central unit-remote unit pathway, the process can be repeated for a plurality of remote units (603(1-$n$)) and plurality of pathways. In step 902, a first unique downstream PRBS is constructed using a first polynomial and first unique seed value. Step 903 transmits the first PRBS including the first polynomial and first unique seed value (shown as 801 in FIG. 8) as an initial downstream signal from the central unit to register frame and symbol alignment with a remote unit(s). The transmission takes place on the established communication pathway during time slots designated for downstream transmission to the remote unit(s). The initial downstream signal transmission is repeated in step 904 during allocated time slots to ensure synchronization is maintain throughout communications. In step 905, a second PRBS including the first polynomial and a second unique seed value is generated (shown as 803 in FIG. 8). Step 906 transmits the second PRBS including the first polynomial and the second unique seed value as an initial upstream signal from the remote unit(s) to register frame and symbol alignment with the central units. The transmission takes place on the established communication pathway during time slots designated for upstream transmission from the remote units. The initial upstream signal transmission is repeated in step 907 during allocated time slots to ensure synchronization is maintain throughout communications. While not shown, as previously described (for FIG. 8), for each line in a multi-line system, a pair of unique seed values $S_1$ and $S_2$ (one seed value per transmit direction) is communicated 801 to each of the two or more remote units prior to a synchronization sequence and wideband signal transmission using a low-bandwidth handshaking or message-exchange protocol.

Synchronization according to the present disclosure can, in various embodiments, also be established in communication systems utilizing FDD or any multi-line, multi-carrier communication system where crosstalk has an impact on system initialization.

In operation, the communication systems described by the technology described herein include one or more applications that include communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data includes voice, audio, video and multimedia applications including Internet gaming, etc. The non-real-time data includes text messaging, email, web browsing, file uploading and downloading, etc.

In an embodiment of the technology described herein, receivers include a receiver processing module and a transmitter processing module that can be implemented via use of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Transmitters and receivers are typically part of a transceiver with individual transmitter and receiver elements not shown for exemplary purpose. The associated memory may be a single memory device or a plurality of memory devices that are either on-chip or off-chip. Such a memory device may be a read-only memory, random access memory, volatile memory, non-volatile memory, static memory, dynamic memory, flash memory, and/or any device that stores digital information. Note that when the processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

The terms "seed value(s)" and "seed(s)" are considered to be interchangeable and equivalent. As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

The technology as described herein has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the technology as described herein have been expressly described herein, other combinations of these features and functions are likewise possible. The technology as described herein is not limited by the particular examples disclosed herein and expressly incorporates these other combinations.

What is claimed is:
1. A method for synchronizing communication signals, the method comprising:
    generating n unique seed values for n remote units;

assigning, for the n remote units, a corresponding one of the n unique seed values to a corresponding one of the n remote units;

transmitting from a central unit to the n remote units the corresponding assigned one of the n unique seed values;

constructing unique pseudo-random bit sequences for each of the n remote units using the corresponding assigned one of the n unique seed values and at least one pseudo-random bit sequence generator polynomial; and transmitting the unique pseudo-random bit sequences to corresponding n remote units for the synchronization of the communication signals.

2. The method according to claim 1 further comprising assigning the n unique seed values in unique seed value pairs.

3. The method according to claim 2, wherein the assigned unique seed value pairs include a first unique seed value to construct the unique pseudo-random bit sequences for downstream communication signals and a second unique seed value to construct the unique pseudo-random bit sequences for upstream communication signals.

4. The method according to claim 2, wherein the assigned unique seed value pairs are transmitted to their corresponding n remote units prior to the synchronization.

5. The method according to claim 2, wherein the assigned unique seed value pairs are transmitted to their respective n remote units using a low-bandwidth handshaking or message-exchange protocol.

6. The method according to claim 1, wherein the n unique seed values are assigned by an independent protocol.

7. The method according to claim 6, wherein the independent protocol comprises G.994.1.

8. The method according to claim 1, wherein the communication signals utilize any of: G.fast, Omega DSL or VDSL standards.

9. The method according to claim 1, wherein the communication signals are transmitted across a multi-line, multi-carrier communication system.

10. The method according to claim 9, wherein the communication system comprises a multi-line time-division duplex (TDD), multi-carrier VDSL communication system.

11. A system for synchronizing communication signals comprising:

a pseudo-random bit sequence generator configured to generate a pseudo-random bit sequence;

a seed value generator configured to generate for each of a plurality of remote communication units at least one unique seed value corresponding to each of the plurality of remote communication units, the at least one unique seed value seeding the generated pseudo-random bit sequence to create a plurality of unique seed pseudo-random bit sequences; and a transmitter configured to transmit the generated unique seed values to the corresponding one of the plurality of remote units and further configured to transmit the unique pseudo-random bit sequences to their corresponding remote communication units for synchronization of communication signals.

12. The system according to claim 11, wherein the transmitter is further configured to transmit across multiple lines using time-division duplex (TDD).

13. The system according to claim 11, wherein the seed value generator is further configured to generate, for each of the plurality of remote communication units, a pair of unique seed values.

14. The system according to claim 13, wherein the pair of unique seed values includes a first unique seed value for downstream communications synchronization and a second unique seed value for upstream communications synchronization.

15. The system according to claim 13, wherein the transmitter is further configured to transmit the pair of unique seed values to a corresponding remote communication unit.

16. The system according to claim 15, wherein the transmitter is further configured to transmit the pair of unique seed values using a low-bandwidth handshaking or message-exchange protocol.

17. The system according to claim 11, wherein the communication signals utilize at least one of: G.fast, Omega DSL or VDSL standards.

18. A method for synchronizing downstream and upstream communication signals between a central unit and a plurality of remote units, the method comprising:

generating unique seed value pairs corresponding to each of the plurality of remote units;

assigning, for the plurality of remote units, a corresponding one of the unique seed value pairs to a corresponding one of the plurality of remote units;

constructing, for each of the plurality of remote units, a downstream pseudo-random bit synchronizing signal including a first seed of the corresponding unique seed value pairs and a pseudo-random bit sequence generator polynomial;

constructing, for each of the plurality of remote units, an upstream pseudo-random bit synchronizing signal using a second seed of the corresponding unique seed value pairs and the pseudo-random bit sequence generator polynomial; and transmitting the downstream and upstream pseudo-random bit synchronizing signals for synchronization of the downstream and upstream communication signals.

19. The method according to claim 18 further comprising transmitting the unique seed value pairs to a corresponding one of the plurality of remote units before synchronization.

20. The method according to claim 18 further comprising transmitting the downstream and upstream pseudo-random bit synchronizing signals during allocated time slots for continued synchronization of the downstream and upstream communication signals.

\* \* \* \* \*